United States Patent
Lim et al.

(10) Patent No.: US 9,538,173 B2
(45) Date of Patent: Jan. 3, 2017

(54) METHOD AND APPARATUS FOR ENCODING/DECODING IMAGE BY USING ADAPTIVE LOOP FILTER ON FREQUENCY DOMAIN USING CONVERSION

(71) Applicant: SK TELECOM CO., LTD., Seoul (KR)

(72) Inventors: Jeongyeon Lim, Seongnam-si (KR); Joong Gunn Park, Suwon Si (KR); Joohee Moon, Seoul (KR); Haekwang Kim, Seoul (KR); Yunglyul Lee, Seoul (KR); Byeungwoo Jeon, Seongnam-si (KR); Jongki Han, Seoul (KR); Juock Lee, Seoul (KR); Mincheol Park, Bucheon-si (KR); Sungwon Lim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 329 days.

(21) Appl. No.: 14/272,793

(22) Filed: May 8, 2014

(65) Prior Publication Data

US 2014/0286392 A1    Sep. 25, 2014

Related U.S. Application Data

(63) Continuation of application No. PCT/KR2012/009421, filed on Nov. 8, 2012.

(30) Foreign Application Priority Data

Nov. 9, 2011 (KR) ........................ 10-2011-0116140

(51) Int. Cl.
*H04N 19/117* (2014.01)
*H04N 19/61* (2014.01)
*H04N 19/82* (2014.01)

(52) U.S. Cl.
CPC ...... *H04N 19/00066* (2013.01); *H04N 19/117* (2014.11); *H04N 19/619* (2014.11); *H04N 19/82* (2014.11)

(58) Field of Classification Search
None
See application file for complete search history.

(56) References Cited

U.S. PATENT DOCUMENTS

2004/0233991 A1* 11/2004 Sugimoto ............ H04N 19/139
                                                          375/240.16
2010/0027686 A1*  2/2010 Zuo .......................... G06T 9/00
                                                          375/240.29

(Continued)

FOREIGN PATENT DOCUMENTS

KR    1020100045549 A     5/2010
KR    1020100136391 A    12/2010
KR    1020100136907 A    12/2010

OTHER PUBLICATIONS

International Search Report mailed Feb. 26, 2013 for PCT/KR2012/009421, citing the above reference(s).

*Primary Examiner* — Kate Luo
(74) *Attorney, Agent, or Firm* — Hauptman Ham, LLP

(57) ABSTRACT

A video encoding method for reducing encoding error by using a loop filter is provided, the method including: generating a reconstructed image from encoded data of an original image; determining one or more regions on which the loop filter is applied in the reconstructed image; transforming the original image and the reconstructed image which correspond to each region of the determined one or more regions from a spatial domain into a frequency domain; determining loop filter coefficients for said each region by comparing the transformed original image and the transformed reconstructed image; loop-filtering the reconstructed image based on the loop filter coefficients for said (Continued)

each region; and encoding information on the loop filter coefficients for said each region.

21 Claims, 8 Drawing Sheets

(56) References Cited

U.S. PATENT DOCUMENTS

| | | | | |
|---|---|---|---|---|
| 2010/0303149 | A1* | 12/2010 | Yasuda | H04N 19/176 |
| | | | | 375/240.03 |
| 2010/0322303 | A1* | 12/2010 | Wada | H04N 19/176 |
| | | | | 375/240.01 |
| 2011/0228841 | A1* | 9/2011 | Suzuki | H04N 19/117 |
| | | | | 375/240.03 |
| 2012/0141037 | A1* | 6/2012 | Sato | H04N 19/159 |
| | | | | 382/224 |

* cited by examiner

| 0 | 3 | 4 | 7 | 8 |
| --- | --- | --- | --- | --- |
| 1 | 2 | 5 | 6 | 9 |
| 22 | 21 | 16 | 15 | 10 |
| 23 | 20 | 17 | 14 | 11 |
| 24 | 19 | 18 | 13 | 12 |

| Positional Category | Final Category |
|---|---|
| 0 | A |
| 1 | B |
| 2 | B |
| 3 | B |
| 4 | B |
| 5 | C |
| 6 | C |
| 7 | C |
| ... | C |
| 15 | C |
| 16 | D |
| 17 | E |
| 18 | F |
| 19 | F |
| 20 | F |
| 21 | G |
| 22 | G |
| 23 | H |
| 24 | H |

*FIG. 5*

METHOD AND APPARATUS FOR ENCODING/DECODING IMAGE BY USING ADAPTIVE LOOP FILTER ON FREQUENCY DOMAIN USING CONVERSION

CROSS-REFERENCE TO RELATED APPLICATION

The instant application is a continuation of PCT/KR2012/009421, filed Nov. 8, 2012, which is based on and claims priority to Korean Patent Application No. 10-2011-0116140, filed on Nov. 9, 2011. The disclosures of above-listed applications are hereby incorporated by reference herein in their entirety.

TECHNICAL FIELD

The present disclosure in some embodiments relates to a method and an apparatus for encoding/decoding a video by using a transform based frequency domain adaptive loop filter.

BACKGROUND

The statements in this section merely provide background information related to the present disclosure and do not constitute prior art.

Decoding a previously compressed and encoded video adds a quantization error and a noise to the decoded video. The inventor(s) has experienced that the video with added quantization error and noise deteriorates the picture quality of the playback video and reduces the prediction efficiency when using the video as a reference image. Therefore, the inventor(s) has noted that using the loop filter is popular as an effective way to reduce the quantization error and noise for improving the picture quality of the playback video and to reduce the difference between the original video and the reconstructed video for increasing the prediction efficiency. The loop filter applies Wiener filters to the reconstructed video for making a sum of squared error (SSE) between the original video and reconstructed video. In order to apply the filter, the video encoding apparatus encodes filter coefficients and flags, which improves the operation efficiency.

In particular, the inventor(s) has noted that in case of inter-frame which uses previously encoded frame, the loop filter improves the efficiency of prediction and thus significantly reduces the amount of bits to be encoded and accordingly enhances the encoding efficiency.

However, the inventor(s) has experienced that in the loop filter according to the prior art, a loop filtering is performed by convoluting the Wiener filter by the unit of pixel. The inventor(s) has experienced that according to such prior art, the greater the size of the Wiener filter, the more complex the video encoding and decoding apparatuses become, and filtering a current pixel needs to use neighboring pixels.

SUMMARY

In accordance with some embodiments of the present disclosure, a video encoding method, performed by the video encoder for reducing encoding error by using a loop filter is provided. The encoding method comprises: generating a reconstructed image from encoded data of an original image; determining one or more regions on which the loop filter is applied in the reconstructed image; transforming the original image and the reconstructed image which correspond to each region of the determined one or more regions from a spatial domain into a frequency domain; determining loop filter coefficients for said each region by comparing the transformed original image and the transformed reconstructed image; loop-filtering the reconstructed image based on the loop filter coefficients for said each region; and encoding information on the loop filter coefficients for said each region.

The method may further comprise encoding information on the one or more regions on which the loop filter is applied in the reconstructed image. For example, the reconstructed image is divided into a plurality of blocks, and a loop filtering flag indicating whether or not a block in the reconstructed image is loop-filtered is encoded in units of the block. Herein, the size of the block is identical to a unit of the loop filtering determined according to a size of the transform from the spatial domain into the frequency domain. Alternatively, a split flag indicating whether a block in the reconstructed image is divided into sub-blocks is encoded by using a quad-tree partition structure, and a loop filtering flag is encoded for a block corresponding to a leaf node in the quad-tree, wherein the loop filtering flag indicates whether or not the corresponding block is loop-filtered.

In accordance with some embodiments of the present disclosure, a video decoding method, performed by a video decoder, using a loop filter is provided. The decoding method comprises: generating a reconstructed image by decoding a bitstream; determining one or more regions on which the loop filter is applied in the reconstructed image; generating loop filter coefficients for each region of the determined one or more regions by decoding the bitstream, the loop filter coefficients being frequency domain values; loop-filtering the reconstructed image based on the loop filter coefficients for said each region.

BRIEF DESCRIPTION OF DRAWINGS

FIG. 5 is an exemplary diagram of a final category classification decided by an encoder according to at least one embodiment.

DETAILED DESCRIPTION

Hereinafter, at least one embodiment of the present disclosure will be described in detail with reference to the accompanying drawings. The present disclosure relates to a method and an apparatus for encoding/decoding a video considering a transform domain loop filter which uses transformed coefficients in a transform domain in the filtering operation to reduce the complexities of video encoding and decoding apparatuses and to reduce the quantization error and noise of the reconstructed video and thereby improve the video compression efficiency and the picture quality of the playback video.

According to at least one embodiment of the present disclosure, filtering operation with transformed coefficients in transform domain reduces the complexities of the video encoding apparatus and video decoding apparatus and reduces the quantization error and noise of the reconstructed video and thereby improves the video compression efficiency and the quality of the playback video.

In addition, at least one embodiment of the present disclosure performs a transform based loop filtering of a reconstructed block.

Further, at least one embodiment of the present disclosure, in case of using a loop filter, reduces the complexities of the video encoding apparatus and video decoding apparatus.

In addition, at least one embodiment of the present disclosure performs a loop filtering in a predetermined block unit.

A video encoding apparatus and/or a video decoding apparatus according to one or more embodiments comprises a PC (personal computer), notebook computer or tablet, PDA (personal digital assistant), PMP (portable multimedia player), game console or PSP (PlayStation Portable), wireless communication terminal, TV, cellular phone or smart phone, and the like. The video encoding apparatus and/or video decoding apparatus mean various apparatuses each including (a) a communication apparatus such as a communication modem and the like for performing communication with various types of devices or wired/wireless communication networks, (b) a memory for storing various programs and data that encode or decode a video, and (c) a microprocessor to execute a program so as to perform calculation and controlling, and the like.

Figure 1:
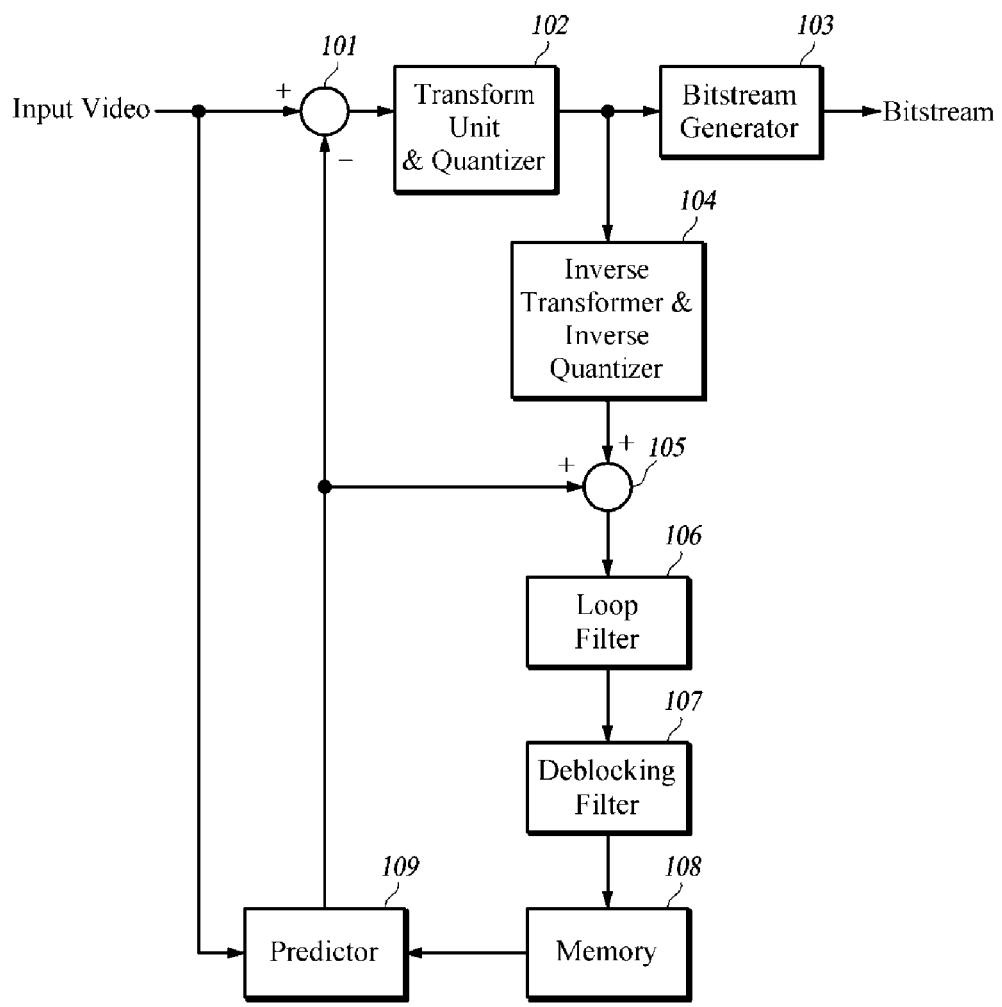
FIG. 1 is a schematic block diagram of a video encoding apparatus according to at least one embodiment of the present disclosure.

FIG. 1 is a schematic block diagram of a video encoding apparatus according to at least one embodiment of the present disclosure.

A video encoding apparatus 100 for encoding a video according at least one embodiment includes a predictor 109, a subtracter 101, a transform unit/quantizer 102, a bitstream generator 103, an inverse quantizer/inverse transformer 104, an adder 105, a loop filter 106, a deblocking filter 107 and a memory 108. All or some components of the video encoding apparatus 100, such as the predictor 109, the subtracter 101, the transform unit/quantizer 102, the bitstream generator 103, the inverse quantizer/inverse transformer 104, the loop filter 106, the deblocking filter 107 and the memory 108 are implemented by one or more processors and/or application-specific integrated circuits (ASICs).

The predictor 109 generates a predicted block by predicting a block to be encoded (hereinafter, referred to as a "current block") in an input image (that is, original image) through an intra prediction or an inter prediction. Although not illustrated in FIG. 1, the video encoding apparatus 100 further includes an intra predictor for the intra prediction and an inter predictor for the inter prediction within the predictor 109.

The subtracter 101 generates a residual block by subtracting a predicted block from the current block.

The transform unit/quantizer 102 transforms and quantizes a residual block. The transform unit/quantizer 102 generates a transformed block having a transform coefficient by transforming a residual signal of the residual block generated by the subtracter 101 into a frequency-domain and quantizes the transform coefficient of the transformed residual block, so as to generate a transformed and quantized residual block. A transform scheme herein uses a technique to transform a pixel signal in a spatial-domain into a signal in a frequency-domain, such as a discrete cosine transform based integer transform or a discrete sine transform based integer transform, and a quantization scheme herein uses various quantization techniques, such as a Dead Zone Uniform Threshold Quantization (DZUTQ) and a quantization weighted matrix.

The bitstream generator 103 encodes the transformed and quantized residual block and header information of each current block. The bitstream generator 103 generates encoded video data by encoding the quantized transform coefficient of the residual block that is transformed and quantized by the transform unit/quantizer 102. At this time, header information of each current block includes prediction information and transform information of the current block. The generated encoded video data is included in a bitstream. An entropy encoding technique is used as such an encoding scheme, but the present disclosure is not limited thereto and uses other various encoding techniques.

The inverse quantizer/inverse transform unit 104 reconstructs the residual block by inversely quantizing and inversely transforming the transformed and quantized residual block. The inverse quantizer/inverse transform unit 104 reconstructs the residual block having the transform coefficient by inversely quantizing the transformed and quantized residual block transmitted from the transform unit/quantizer 102, and reconstructs the residual signal by performing an inverse transform on the residual block having the transform coefficient. At this time, the inverse quantizer/inverse transform unit 104 can reconstruct the residual block in a spatial domain by inversely performing the transform/quantization process performed by the transform unit/quantizer 102.

The adder 105 reconstructs the current block by adding the reconstructed residual block and the predicted block.

The loop filter 106 removes a quantization error and noise of a reconstructed current frame comprised of the reconstructed current blocks, for example by using the Wiener filter. In this case, the loop filter 106 generates loop filter information and loop filtering flag information. This information is encoded in the bitstream generator 103 as a slice header, a loop filter header or an arbitrary header. For example, when one frame is divided into two slices, loop filter information and loop filtering flag information which correspond to the first slice are encoded into a header of the first slice, and loop filtering flag information which correspond to the second slice are encoded into a header of the second slice. Alternatively, the loop filter information is encoded in the loop filter header, and loop filtering flag information corresponding to each slice is encoded into a header of each slice.

The deblocking filter 107 deblocking-filters a current frame which has been reconstructed and has passed through a loop filtering, and the memory stores the deblocking-filtered current frame. The deblocking filtering means an operation for reducing block distortion occurring during the encoding of the video block-wise. To this end, the deblocking filter is applied to a coding block boundary, a transform block boundary, a prediction block boundary and the like. Alternatively, the deblocking filter is applied to one of the encoded block boundary, transform block boundary and prediction block boundary, or it is not be used.

Figure 2:
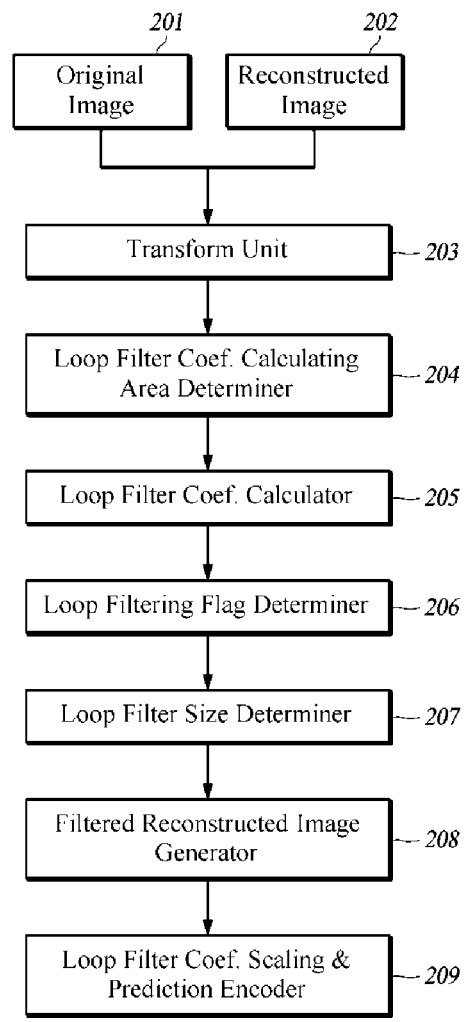
FIG. 2 is a schematic block diagram of a loop filter apparatus for a video encoding apparatus according to at least one embodiment.

FIG. 2 is a schematic block diagram of the loop filter 106 for encoding a video according to at least one embodiment.

In FIG. 2, a transform unit 203 transforms an original image 201 and a reconstructed image 202 from a spatial domain into a frequency domain to perform a loop filtering in the frequency domain (also, referred to as a transform domain) Herein, the original image and the reconstructed image are a frame or part of the frame such as a block. At least one embodiment of the present disclosure removes a quantization error and noise from the reconstructed image by filtering the reconstructed image in the transform domain so that the transform coefficient of the reconstructed image is similar to a transform coefficient of the original image. At this time, the transform includes a discrete cosine transform-based integer transform or a discrete sine transform-based integer transform. In the transform, the loop filtering is performed after an N×N transform, after a 1×N or N×1 transform, or after an N×M or M×N transform. A loop filter coefficient to be encoded by the video encoding apparatus 100 is determined depending on the size of the transform. For example, with the 1×N transform performed, a loop filter coefficient to be encoded by the bitstream generator 103 is 1×N. With the M×N transform performed, the loop filter coefficient to be encoded by the bitstream generator 103 is M×N.

Figures 3, 4:
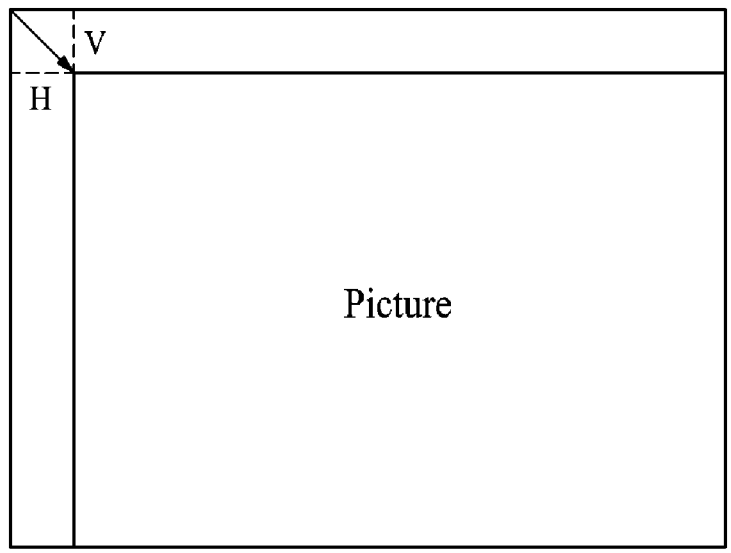
FIG. 3 is an exemplary diagram of a process of changing position of a video according to at least one embodiment.
FIG. 4 is an exemplary diagram of classifying respective positional categories depending on the positions of candidate transform blocks in a frame according to at least one embodiment.

Further, when the loop filtering is performed in the transform domain, the transformed block boundary is not filtered, and therefore the original frame and the reconstructed frame are moved by H and V pixel units as illustrated in FIG. 3.

In this case where the N×1 transform is performed, the frames are moved by only H pixels in a horizontal direction, and are moved by only V pixels in a vertical direction when the 1×N transform is performed. Also, when the N×N transform is performed, the frames are moved by (H, V) pixels in the horizontal and vertical direction.

A loop filter coefficient calculating area determiner 204 determines candidate transformed blocks by a criterion in order to calculate the loop filter coefficient in the transform domain. The loop filter coefficient calculating area determiner 204 determines one or more regions on which the loop-filtering is performed in the reconstructed image. According to at least one embodiment of the present disclosure, one frame can be loop-filtered by using a plurality of filters. The criterion (i.e., classification criterion) for determining the candidate transformed blocks is based on the positions of the candidate transformed blocks within a frame, variances in a spatial domain of respective candidate transformed blocks, or calculated edges in the spatial domain of the respective candidate transformed blocks. That is, the classification criterion includes at least one selected the group comprising of (i) a position of said each block, (ii) variances of said each block in the spatial domain and (iii) edges of said each block in the spatial domain. Referring FIG. 4, where the candidate transformed blocks are determined based on their positions within the frame, the candidate transformed blocks are classified by such positions in the frame into respective positional categories, for each of which one or more filters are generated. Positional category 0 has an optimal filter for positional number 0, and positional category 1 has an optimal filter for positional number 1.

Further, with the option of using the variances of the respective candidate transformed blocks in the spatial domain, the variances of the respective candidate transformed blocks are calculated, and the respective candidate transformed blocks are classified. The classification is made, based on the magnitudes of the horizontal and vertical variances of each candidate transformed block, into respective variance categories, for each of which one or more filters are generated. For example, a filter through the N×1 transform is generated when the variance is vertically larger, a filter through the 1×N transform is generated when the variance is horizontally larger, and a filter using the N×N transform is generated when vertical variance and horizontal variance are the same.

Alternatively, when using spatial domain edges of the respective candidate blocks, they are classified into one of three edge categories of a horizontal-edge category, a vertical-edge category, and a non-edge category, for each of which one or more filters are generated. For example, the horizontal-edge category generates a filter using the 1×N transform, the vertical-edge category generates a filter using the N×1 transform, and a filter using the N×N transform is generated when there is no edge. According to at least one embodiment of the present disclosure, one or more regions are determined pursuant to the determined categories. For example, blocks belonging to the same category are classified into a region.

At this time, the loop filter coefficient calculating area determiner 204 encodes the arbitrary criterion, and categories by the respective criterion are generated as in a video decoding apparatus 800 which will be described below. For example, when using both the spatial domain edges of the respective candidate transformed blocks and the variance as the loop filter coefficient calculating area determination criterion, the video encoding apparatus 100 encodes the optimal criterion selected for the current frame as a loop filter coefficient calculating area criterion flag. Then, the video decoding apparatus 800 generates the categories of each candidate transformed blocks according to the loop filter coefficient calculating area criterion flag extracted by a bitstream decoder 801 therein.

A loop filter coefficient calculator 205 calculates a loop filter coefficient in the transform domain with reference to Equation 1.

$$\frac{\partial D}{\partial \tilde{W}} = 0 \quad \text{Equation 1}$$

D in Equation 1 is calculated with reference to Equation 2, and $\tilde{W}$ is calculated with reference to Equation 3.

$$D_{m,n} = \sum_{k \in K} \{Q_{m,n}(k) - P'_{m,n}(k)\} \quad \text{Equation 2}$$
$$= \sum_{k \in K} \{Q_{m,n}(k) - \tilde{W}_v \times P_{m,n}(k)\}$$

$Q_m(k)$ in Equation 2 denotes a coefficient of the transformed original image at position m of a $k^{th}$ block, $P_m(k)$ denotes a coefficient of the transformed reconstructed image at position m of the $k^{th}$ block, and $\tilde{W}$ denotes a transform domain filter coefficient at position v. The uppercase "K" means a $K^{th}$ category.

Equation 3 is calculated with reference to Equations 1 and 2.

$$\tilde{W}_v = \frac{\sum_{k \in K} Q_{m+v,n}(k) P_{m+v,n}(k)}{\sum_{k \in K} P_{m+v,n}(k) P_{m+v,n}(k)} \qquad \text{Equation 3}$$

Equation 3 is for calculating the transform domain filter coefficient.

At this time, the loop filter coefficient is calculated for each category determined by the loop filter coefficient calculating area determiner 204. When there are a number of calculated loop filters or categories, the categories are combined into one category. For example, referring to FIG. 4, category 0 and category 1 is defined as one category, and a reference is made to Equation 3 for generating an optimal loop filter for an area category 0 and category 1. Alternatively, category 5 through category 15 is defined as one category, and a reference is made to Equation 3 for generating an optimal loop filter for an area from category 5 to category 15. In this case, the loop filter coefficient calculator encodes a loop filter category map and a final category-wise filter. For example, referring to FIG. 4, when a loop filter category map is (1, 1, 0, 0, 0, 1, 0, 0, 0, 0, 0, 0, 0, 0, 0, 1, 1, 1, 0, 0, 1, 0, 1, 0), the final category is as illustrated in FIG. 5. Herein, "1" of the exemplary category map means that a new category is assigned to the corresponding block, and thus the position category of the corresponding block is different from that of the previous block. "0" means that the position category of the corresponding block is identical to that of the previous block, i.e., the corresponding block and the previous block are combined into one category.

The loop filter category map is determined according to a rate-distortion cost, a Sum Squared of Error (SSE), or a filter encoding bit. Further, an optimal loop filter coefficient is calculated for each final category.

Figure 6:
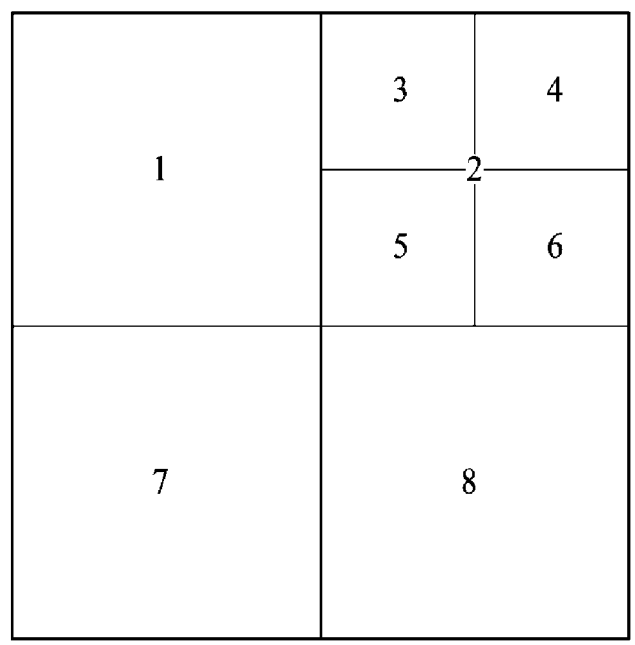
FIG. 6 is an exemplary diagram of loop filter flags according to at least one embodiment.

The loop filtering flag determiner 206 determines whether to perform a loop filtering in units of an area by using the optimal loop filter coefficients calculated for each final category by the loop filter coefficient calculator 205. At this time, the loop filtering flag determiner 206 encodes loop filtering flag information. For example, when the filtering is performed by frame unit, a loop filter frame filtering flag is encoded. When the filtering is not performed by frame unit, a loop filter flag is encoded in units of the arbitrary area. The arbitrary area is determined by using a split flag. When the split flag is used, it is encoded from a maximum filtering unit. When the final split is determined, loop filtering flag information is encoded. Referring to FIG. 6, the split flag is encoded into each of blocks 1 to 8, and the loop filtering flag is encoded in blocks 1, 3, 4, 5, 6, 7 and 8.

Further, instead of encoding the split flag, a loop filter maximum split depth, the number of loop filtering flags, and the loop filtering flags are encoded into a bitstream. For example, referring to FIG. 6, when the loop filtering is performed for blocks 1, 4, 5 and 8, the loop filter maximum split depth from a maximum filtering unit is 1, the number of loop filtering flags is 16, and the loop filtering flags are encoded as (1, 1, 1, 1, 1, 1, 0, 1, 1, 0, 0, 1, 1, 1, 1, 1). A filtering performed without splitting like block 1 gives encoding into 1 followed by four 1s from encoding four loop filtering flags which are encoded if block 1 would be split up to the maximum split depth. When neither splitting nor filtering is performed as in block 7, only 0 is encoded. The same procedure of block 1 applies to block 8. In this event, the number of loop filtering flags can be encoded as "12". The loop filtering flags of blocks 1, 2, 7, and 8 in a size of the maximum filtering unit are encoded as a default, and therefore the number of flags can be encoded without counting these default loop filtering flags. The video decoding apparatus 800 decodes the number of loop filter flags from the bitstream in the first place and adds this decoded number to e.g., 4 which is the number of the blocks (blocks 1, 2, 7 and 8) of which the loop filter flags is decoded as a default. In this exemplary embodiment, since the decoded number of loop filter flags are e.g., 12, the resultant number of loop filtering flags to be decoded is 16. Consequently, the video decoding apparatus 800 decodes a total of 16 loop filtering flags from the bitstream.

A loop filter size determiner 207 determines the size of N in the 1×N, N×1 or N×N transform. At this time, the size of N is determined by using the loop filter category map and the final category-wise optimal loop filter coefficients calculated by the loop filter coefficient calculator 205, and the loop filtering flag determined by the loop filtering flag determiner 206.

Alternatively, when the loop filtering flag is determined in units of an arbitrary area, final category-wise optimal loop filter coefficients are recalculated with reference to only an area to be filtered. Further, in this case, a loop filter maximum split depth determined by the loop filtering flag determiner 206 is recalculated according to the size of N. Rather, N, which is larger than a block having the loop filter maximum split depth, is not be determined as an optimal loop filter size. Alternatively, N smaller than a block having the loop filter maximum split depth is not be determined as the optimal loop filter size.

Further, the loop filter size determiner 207 calculates optimal loop filter coefficients for each final loop filter category according to the size of N.

A filtered reconstructed image generator 208 generates a filtered reconstructed image according to the previously determined information. For example, the filtered reconstructed image is reconstructed by inversely transforming a coefficient of the filtered reconstructed image in the transform domain. In this case, the video decoding apparatus 800 filters the coefficient of the reconstructed-image in the transform domain by using the loop filter coefficient reconstructed from the bitstream and inversely transforms the coefficient of the filtered reconstructed image, so as to generate the loop-filtered reconstructed image.

Alternatively, when the 1×N or N×1 transform was used, the loop-filtered reconstructed image is generated by using Equation 4.

$$p'_{x,y}(k) = T^{-1}_{i,j} \times (W_u \times (T_{i,j} \times p_{x,y}(k))) \qquad \text{Equation 4}$$

In Equation 4, T denotes a basis matrix of the 1×N or N×1 transform, $T^{-1}$ denotes an inverse basis matrix, $p_x(k)$ denotes a reconstructed image pixel at position x in a kth block, and $p'_x(k)$ denotes a filtered reconstructed image pixel at position x in the kth block.

By solving Equation 4, the filtered reconstructed image is generated through a sum of reconstructed image pixels and a product of a transform basis matrix and a filter coefficient. For example, the filtered reconstructed image is generated with reference to Equation 5.

$$p'_{x,y}(k) = M_{i,j} \times p_{x,y}(k) \qquad \text{Equation 5}$$

$M_{i,j}$ in Equation 5 is calculated through Equation 6.

$$M_{i,j} = T^{-1}_{i,j} \times W_u \times T_{i,j} \qquad \text{Equation 6}$$

Figure 7A:
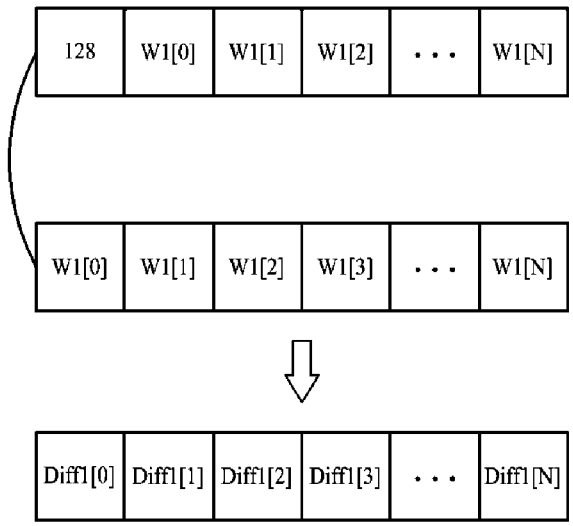
FIG. 7A and FIG. 7B are exemplary diagrams of loop filter coefficient prediction encoding according to at least one embodiment.

A loop filter coefficient scaling and prediction encoding is performed by scaling a final category-wise optimal filter coefficients into an integer and prediction-encoding each coefficient through an arbitrary method. For example, a filter is generated by using the 1×N transform, a 7-bit coefficient scaling is performed, and a coefficient encoding is performed with reference to FIG. 7A when using an intra prediction.

Figure 7B:
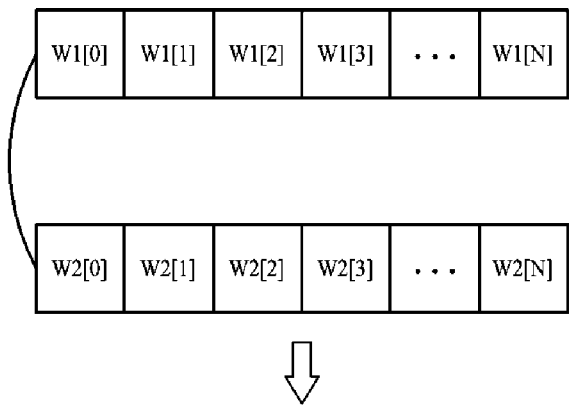

When an inter prediction is used, the encoding is performed with reference to FIG. 7B.

Alternatively, an optimal prediction for each filter between the inter prediction and the intra prediction is used. In this case, a loop filter coefficient prediction flag is encoded for each filter. The video decoding apparatus 800 decodes the loop filter coefficient prediction flag for each filter from the bitstream to reconstruct loop filter coefficients.

Further, each filter coefficient is encoded and decoded by using a kth order Golomb code. At this time, an optimal kth order is determined for each filter coefficient. For example, when a 1×4 filter coefficient is encoded, a first filter coefficient difference is encoded by a primary Golomb code, a second filter coefficient difference is encoded by the primary Golomb code, a third filter coefficient difference is encoded by a secondary Golomb code, and a fourth filter coefficient difference is encoded by a tertiary Golomb code. In this case, k of the first filter coefficient difference is encoded and a kth order map is encoded as (0, 1, 1). The video decoding apparatus 800 decodes k from the bitstream and decodes the kth order map.

Figure 8:
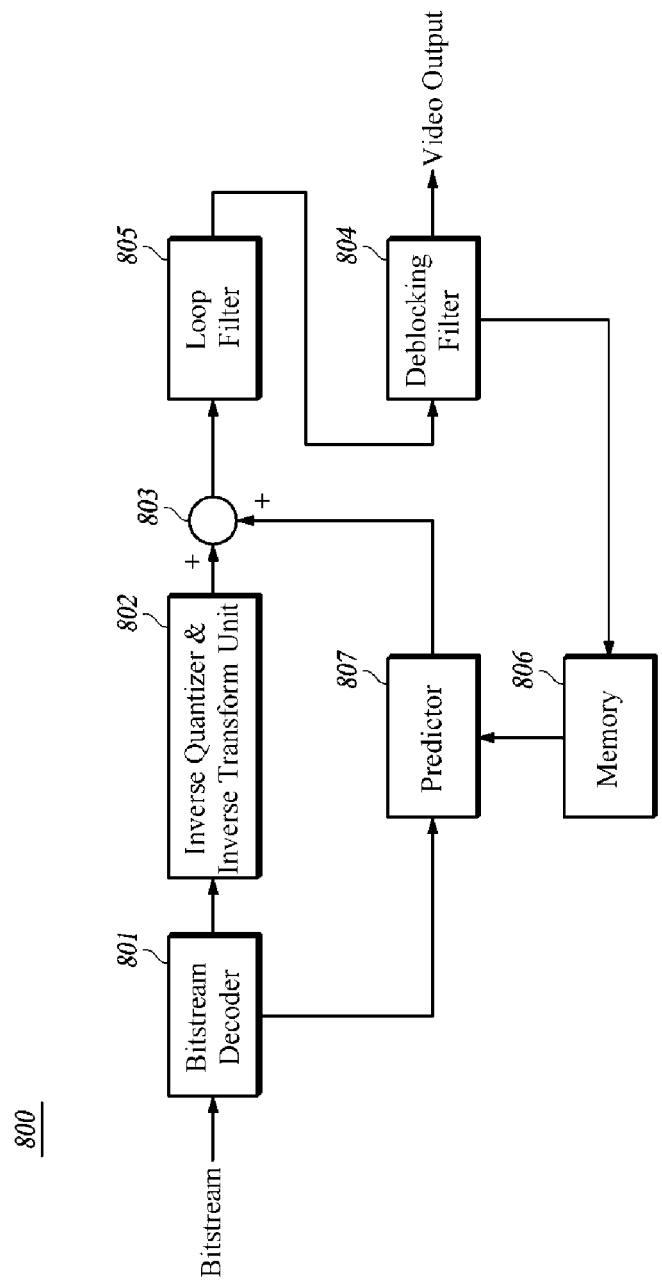
FIG. 8 is a schematic block diagram of a video decoding apparatus according to at least one embodiment of the present disclosure.

FIG. 8 is a schematic block diagram of a video decoding apparatus according to at least one embodiment of the present disclosure.

Similar to the aforementioned video encoding apparatus, the video decoding apparatus 800 of at least one embodiment comprises a PC (personal computer), notebook computer or tablet, PDA (personal digital assistant), PMP (portable multimedia player), game console or PSP (PlayStation Portable), wireless communication terminal, TV, and the like. The video encoding apparatus means various apparatuses each including (a) a communication apparatus such as a communication modem and the like for performing communication with various types of devices or wired/wireless communication networks, (b) a memory for storing various programs and data that encode or decode a video, and (c) a microprocessor to execute a program so as to perform calculation and controlling, and the like.

The video decoding apparatus 800 according to at least one embodiment of the present disclosure comprises a bitstream decoder 801, an inverse quantizer/inverse transform unit 802, an adder 803, a deblocking filter 804, a loop filter 805, a memory 806 and a predictor 807. All or some components of the video decoding apparatus 800, such as the bitstream decoder 801, the inverse quantizer/inverse transform unit 802, the adder 803, the deblocking filter 804, the loop filter 805, the memory 806 and the predictor 807 are implemented by one or more processors and/or application-specific integrated circuits (ASICs).

The bitstream decoder 801 extracts a quantized transformed block by decoding a bitstream. The bitstream decoder 801 reconstructs the quantized transformed block having a quantized transform coefficient by decoding and inversely scanning bit strings extracted from the input bitstream. At this time, the bitstream decoder 801 performs the decoding by using an encoding scheme such as an entropy encoding used by the bitstream generator 103. Further, in case of the inter prediction, the bitstream decoder 801 reconstructs a differential vector by extracting an encoded differential vector from the bitstream and decoding the extracted encoded differential vector and reconstruct a motion vector of a current block by decoding a motion parameter. In case of the intra prediction, the bitstream decoder 801 informs the predictor of which intra prediction mode was used for the current block, by extracting and decoding an encoded intra prediction mode index from the bitstream.

The inverse quantizer/inverse transform unit 802 reconstructs a residual block by inversely quantizing and inversely transforming the quantized transformed block. The inverse quantizer/inverse transform unit 802 reconstructs a transformed residual block having a transform coefficient by inversely quantizing the quantized transformed block and reconstructs a residual block by inversely transforming the transformed residual block. At this time, the inverse quantizer/inverse transform unit 802 reconstructs the residual block by inversely performing the transform and quantization process of the transform unit/quantizer 102.

The adder 803 reconstructs the current block by adding the reconstructed residual block and a predicted block.

The loop filter 805 removes a quantization error and noise of a reconstructed current frame comprised of the reconstructed current block, for example, by using the Wiener filter.

The deblocking filter 804 deblocking-filters the current frame which has been reconstructed and passed through a loop filtering, and the memory 806 stores the deblocking-filtered current frame. Here, the deblocking filtering refers to an operation for reducing a block distortion occurring during the encoding of the video block-wise. The deblocking filter is applied to an coding block boundary, a transform block boundary, a prediction block boundary and the like. Alternatively, the deblocking filter is applied to one of the encoded block boundary, transform block boundary and prediction block boundary, or it is not be used.

The predictor 807 includes an intra predictor and an inter predictor, and generates a predicted block of a current block to be reconstructed, by using a parameter extracted from the bitstream.

Similar to the memory of the video encoding apparatus, the memory 806 stores a decoded video, which can be used for the subsequent prediction.

Meanwhile, the bitstream decoder 801 decodes a header and prediction information from the bitstream. Further, when a loop filtering is performed, the bitstream decoder 801 decodes a loop filter coefficient calculating area criterion flag. A loop filter candidate transformed block or a loop filter transformed block is classified by an criterion according to the loop filter coefficient calculating area criterion flag. Subsequently, a loop filter size is decoded. Next, a loop filter category map and loop filter coefficients according to the loop filter category map are decoded. At this time, it is required to decode a kth order map for decoding the loop filter coefficients and to decode a loop filter coefficient predicting flag for reconstructing the loop filter coefficients. Next, the loop filter flag is decoded.

Figure 9:
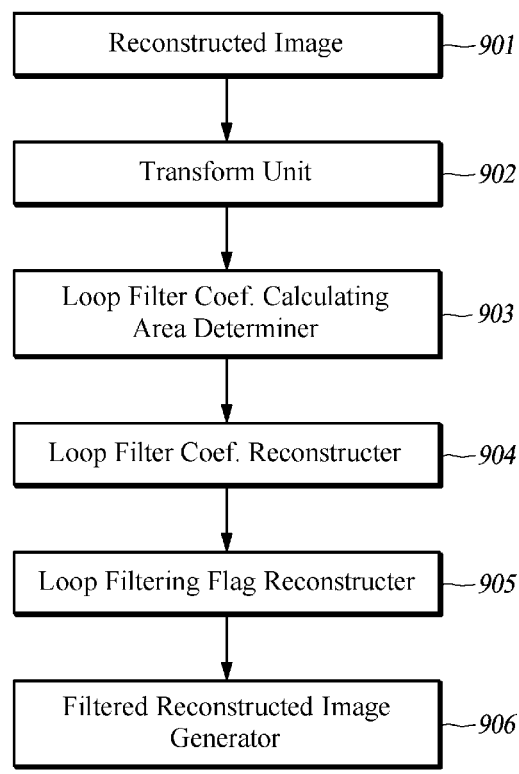
FIG. 9 is a schematic block diagram of a loop filter apparatus for a video decoding apparatus according to at least one embodiment of the present disclosure.

FIG. 9 is a schematic block diagram of a loop filter 805 for video decoding according to at least one embodiment of the present disclosure.

A transform unit 902 transforms a reconstructed image. Herein the reconstructed image is the reconstructed frame or part thereof such as a block. The transform is performed for loop-filtering the reconstructed image in the frequency domain. However, the video decoding apparatus 800 does not need the transform unit 902 depending on a filtered reconstructed image generator 906. For example, the filtered reconstructed image generator 906 generates a filtered reconstructed image by loop-filtering the reconstructed image transformed by the transform unit 902 and then inversely transforming the loop-filtered image. In this case, the transform unit 902 is needed. Alternatively, the filtered reconstructed frame generator 906 generates the filtered reconstructed image by multiplying $M_{i,j}$ and the reconstructed image (non-transformed image) by Equation 5, wherein $M_{i,j}$ is calculated by Equation 6. In this case, the transform unit 902 is configured to be an optional component for the video decoding apparatus 800.

A loop filter coefficient calculating area determiner 903 operates in the same way as the loop filter coefficient calculating area determiner 204 of the video encoding apparatus 100.

A loop filter coefficient reconstructer 904 operates inversely of the loop filter coefficient scaling and prediction encoder 209.

A loop filtering flag reconstructer 905 reconstructs one or more loop filtering flag by filtering unit or coding unit by using a split flag or split flags and extracted from the bitstream.

The filtered reconstructed frame generator 906 operates in the same way as the filtered reconstructed frame generator 208 in the video encoding apparatus 100. All or some components of the loop filter 805, such as transform unit 902, the loop filter coefficient calculating area determiner 903, the loop filter coefficient reconstructer 904, the loop filtering flag reconstructer 905 and the filtered reconstructed frame generator 906 are implemented by one or more processors and/or application-specific integrated circuits (ASICs).

Meanwhile, a video encoding/decoding apparatus according to at least one embodiment of the present disclosure is implemented by connecting a bitstream (encoded data) output terminal of the video encoding apparatus of FIG. 1 with a bitstream input terminal of the video decoding apparatus of FIG. 8.

A video encoding/decoding apparatus according to at least one embodiment of the present disclosure includes the video encoding apparatus 100 which implements the video encoder as described. The video encoding apparatus 100 is configured to perform a transform of an original image and of a reconstructed image from the original image after being encoded; to determine a loop filter coefficient calculating area in a predetermined filtering unit by using pixels of the reconstructed image; to calculate loop filter coefficients, in accordance with a determination by the loop filter coefficient calculating area determiner, by using transform coefficients of the transformed original image and the transformed reconstructed-image; to determine a loop filtering flag in the filtering unit by using the loop filter coefficient; to determine a loop filter size depending on the size of the transform; to generate a filtered reconstructed image by using the loop filter coefficient; and to predictively encode the loop filter coefficients by scaling them on a predetermined scale and predicting the scaled loop filter coefficients. The video encoding/decoding apparatus further includes the video decoding apparatus 800 which implements the video decoder as described. The video decoding apparatus 800 is configured to transform an image reconstructed from a bitstream; to determine a loop filter coefficient calculating area in a predetermined filtering unit by using pixels of the reconstructed-image; to reconstruct loop filter coefficients by a loop filter coefficient predicting method, by using loop filter residual coefficients extracted from the bitstream; to extract one or more loop filtering flags from the bitstream; and to generate a filtered reconstructed frame by using the reconstructed loop filter coefficients.

A method of encoding a video according to at least one embodiment of the present disclosure includes steps of: performing a transform of an original-image and of a reconstructed image from the original image after being encoded; determining a loop filter coefficient calculating area in a predetermined filtering unit by using pixels of the reconstructed-image; calculating loop filter coefficients, in accordance with a determination by the loop filter coefficient calculating area determiner, by using transform coefficients of the transformed original-image and the transformed reconstructed image; determining a loop filtering flag in the filtering unit by using the loop filter coefficients; determining a loop filter size depending on the size of the transform; generating a filtered reconstructed image by using the loop filter coefficients; and predictively encoding the loop filter coefficients by scaling them on a predetermined scale and predicting the scaled loop filter coefficients.

A method of decoding a video according to at least one embodiment of the present disclosure includes steps of: transforming an image reconstructed from a bitstream; determining a loop filter coefficient calculating area in a predetermined filtering unit by using pixels of the reconstructed-image; reconstructing loop filter coefficients by a loop filter coefficient predicting method, by using loop filter residual coefficients extracted from the bitstream; extracting one or more loop filtering flag from the bitstream; and generating a filtered reconstructed image by using the reconstructed loop filter coefficients.

A video encoding/decoding method according to at least one embodiment of the present disclosure is implemented by combining a video encoding method according to at least one embodiment of the present disclosure and a video decoding method according to at least one further embodiment of the present disclosure.

A video encoding/decoding method according to at least one embodiment of the present disclosure includes: a video encoding process comprising: performing a transform of an original image and of a reconstructed image from the original image after being encoded; determining a loop filter coefficient calculating area in a predetermined filtering unit by using pixels of the reconstructed image; calculating loop filter coefficients, in accordance with a determination by the loop filter coefficient calculating area determiner, by using transform coefficients of the transformed original image and the transformed reconstructed image; determining a loop filtering flag in the filtering unit by using the loop filter coefficients; determining a loop filter size depending on the size of the transform; generating a filtered reconstructed image by using the loop filter coefficients; and predictively encoding the loop filter coefficients by scaling them on a predetermined scale and predicting the scaled loop filter coefficients. The video encoding/decoding method further includes a video decoding process comprising: transforming an image reconstructed from a bitstream; determining a loop filter coefficient calculating area in a predetermined filtering unit by using pixels of the reconstructed image; reconstructing loop filter coefficients by a loop filter coefficient predicting method, by using loop filter residual coefficients extracted from the bitstream; extracting one or more loop filtering flag from the bitstream; and generating a filtered reconstructed image by using the reconstructed loop filter coefficients.

According to the present disclosure as described above, filtering operation with transformed coefficients in transform domain reduces the complexities of the video encoding apparatus and video decoding apparatus and reduces the quantization error and noise of the reconstructed video and thereby improves the video compression efficiency and the quality of the playback video.

Further, when utilizing a loop filtered video as a reference video, the present disclosure can improve the prediction efficiency.

In addition, the present disclosure can reduce the complexities of the video encoding apparatus and video decoding apparatus by applying loop filtering by block unit in the transform domain.

In the description above, although all of the components of the embodiments of the present disclosure have been explained as assembled or operatively connected as a unit, one of ordinary skill would understand the present disclosure is not limited to such embodiments. Rather, within some embodiments of the present disclosure, the respective components are selectively and operatively combined in any number of ways. Every one of the components are capable of being implemented alone in hardware or combined in part or as a whole and implemented in a computer program having program modules residing in computer readable media and causing a processor or microprocessor to execute functions of the hardware equivalents. Codes or code segments to constitute such a program are understood by a person skilled in the art.

Some embodiments as described above are implemented in the form of one or more program commands that are read and executed by a variety of computer systems and be recorded in any non-transitory, computer-readable recording medium. The non-transitory computer-readable recording medium includes a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the various characteristics of the disclosure. That is, it is understood that the present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not limited by the explicitly described above embodiments but by the claims and equivalents thereof.

What is claimed is:

1. A video encoding method using a loop filter, the method comprising:
generating a reconstructed image from encoded data of an original image;
determining, in the reconstructed image, one or more regions on which the loop filter is applied;
transforming the original image and the reconstructed image which correspond to each region of the determined one or more regions from a spatial domain into a frequency domain;
determining loop filter coefficients for said each region by comparing the transformed original image and the transformed reconstructed image;
loop-filtering the reconstructed image based on the loop filter coefficients for said each region; and
encoding information on the loop filter coefficients for said each region,
wherein the loop-filtering of the reconstructed image comprises:
loop-filtering the transformed reconstructed image in the frequency domain, by using the loop filter coefficients for said each region; and
inversely transforming the transformed reconstructed image loop-filtered in the frequency domain.

2. The method of claim 1, wherein the loop filter coefficients are values in the frequency domain.

3. The method of claim 1, wherein the reconstructed image is loop-filtered in the spatial domain by using a first matrix, a second matrix and a third matrix,
wherein the first matrix is a matrix used for the transform from the spatial domain into the frequency domain,
the second matrix is a matrix comprised of the loop filter coefficients for said each region, and
the third matrix is an inverse transform matrix of the first matrix.

4. The method of claim 1, wherein the determining of the one or more regions comprises:
determining categories of each block in the reconstructed image based on a classification criterion; and
determining the one or more regions pursuant to the determined categories.

5. The method of claim 4, wherein the classification criterion includes at least one selected from group comprising of (i) a position of said each block, (ii) variances of said each block in the spatial domain and (iii) edges of said each block in the spatial domain.

6. The method of claim 5, wherein information on the classification criterion is encoded.

7. The method of claim 4, wherein a plurality of categories which are different from each other among the determined categories are merged into a category, and
a category map indicating whether the plurality of categories are merged is encoded.

8. The method of claim 1, further comprising:
encoding information on the one or more regions on which the loop filter is applied in the reconstructed image.

9. The method of claim 8, wherein the reconstructed image is divided into a plurality of blocks, and a loop filtering flag indicating whether or not a block of the plurality of blocks in the reconstructed image is loop-filtered is encoded in units of the block.

10. The method of claim 9, wherein a size of the block is identical to a unit of the loop filtering determined according to a size of the transform from the spatial domain into the frequency domain.

11. The method of claim 8, wherein a split flag indicating whether a block of the plurality of blocks in the reconstructed image is divided into sub-blocks is encoded by using a quad-tree partition structure, and a loop filtering flag is encoded for a block corresponding to a leaf node in the quad-tree, wherein the loop filtering flag indicates whether or not the corresponding block is loop-filtered.

12. A video decoding method using a loop filter, comprising:

generating a reconstructed image by decoding a bitstream;

determining, in the reconstructed image, one or more regions on which the loop filter is applied;

generating loop filter coefficients for each region of the determined one or more regions by decoding the bitstream, the loop filter coefficients being frequency domain values;

loop-filtering the reconstructed image based on the loop filter coefficients for said each region wherein the loop-filtering of the reconstructed image comprising:

transforming the reconstructed image corresponding to said each region of the determined one or more regions from a spatial domain into a frequency domain;

loop-filtering the transformed reconstructed image in the frequency domain, by using the loop filter coefficients for said each region; and inversely transforming the transformed reconstructed image loop-filtered in the frequency domain.

13. The method of claim 12, wherein the reconstructed image is loop-filtered in the spatial domain by using a first matrix, a second matrix and a third matrix, wherein the first matrix is a matrix which is used for transforming the reconstructed image from a spatial domain into a frequency domain, the second matrix is a matrix comprised of the loop filter coefficients for said each region, and the third matrix is an inverse transform matrix of the first matrix.

14. The method of claim 12, wherein determining of the one or more regions comprises:

determining categories of each block in the reconstructed image based on a classification criterion; and determining the one or more regions pursuant to the determined categories.

15. The method of claim 14, wherein the classification criterion includes at least one selected from group comprising of (i) a position of said each block, (ii) variances of said each block in the spatial domain and (iii) edges of said each block in the spatial domain.

16. The method of claim 15, wherein the classification criterion is identified based on information included in the bitstream.

17. The method of claim 14, wherein determining of the categories of said each block comprising:

decoding a category map from the bitstream; and merging a plurality of categories which are different from each other among the determined categories into a category, based on the decoded category map.

18. The method of claim 12, wherein the reconstructed image is loop-filtered by referring to information extracted from the bitstream, the extracted information relating to the one or more regions on which the loop filter is applied in the reconstructed image.

19. The method of claim 18, wherein a loop filtering flag indicating whether or not a block in the reconstructed image is loop-filtered is decoded in units of the block from the bitstream, and the reconstructed image is loop-filtered according to the loop filtering flag.

20. The method of claim 19, wherein a size of the block is identical to a unit of the loop filtering.

21. The method of claim 18, wherein a split flag indicating whether a block in the reconstructed image is divided into sub-blocks is decoded from the bitstream by using a quad-tree partition structure, a loop filtering flag for a block corresponding to a leaf node in the quad-tree is decoded from the bitstream, the loop filtering flag indicating whether the corresponding block is loop-filtered, and the reconstructed image is loop-filtered according to the loop filtering flag.

* * * * *